(12) United States Patent
Mohammadi (10) Patent No.: US 11,788,599 B1
(45) Date of Patent: Oct. 17, 2023

(54) METHODS OF MANUFACTURING VEHICLE DAMPER

(71) Applicant: DRiV Automotive Inc., Southfield, MI (US)

(72) Inventor: Amirahmad Mohammadi, Bonn (DE)

(73) Assignee: DRiV Automotive Inc., Northville, MI (US)

( * ) Notice: Subject to any disclaimer, the term of this patent is extended or adjusted under 35 U.S.C. 154(b) by 0 days.

(21) Appl. No.: 17/717,833

(22) Filed: Apr. 11, 2022

(51) Int. Cl.
*B60G 13/00* (2006.01)
*F16F 9/32* (2006.01)

(52) U.S. Cl.
CPC ........ *F16F 9/3271* (2013.01); *B60G 2206/81* (2013.01); *B60G 2206/82092* (2013.01); *F16F 9/3235* (2013.01); *F16F 2226/045* (2013.01); *F16F 2230/0005* (2013.01)

(58) Field of Classification Search
CPC .. F16F 9/3271; F16F 9/3235; F16F 2226/045; F16F 2230/0005; F16F 2234/02; F16F 2230/24; B60G 2206/81; B60G 2206/82092; B60G 2206/89
See application file for complete search history.

(56) References Cited

U.S. PATENT DOCUMENTS

| | | |
|---|---|---|
| 1,775,055 A | 9/1930 | Tarbox et al. |
| 2,001,204 A | 5/1935 | Long et al. |
| 2,205,697 A | 6/1940 | Scharpenberg |
| 2,588,018 A | 3/1952 | Lauenstein |
| 2,789,812 A | 4/1957 | Ruegg et al. |
| 3,299,680 A | 1/1967 | Thompson |
| 3,473,359 A | 10/1969 | Joslin |
| 3,548,623 A | 12/1970 | Hess et al. |
| 4,143,535 A | 3/1979 | Bouman |

(Continued)

FOREIGN PATENT DOCUMENTS

| | | |
|---|---|---|
| DE | 8506529 U1 | 5/1985 |
| DE | 102007021228 A1 | 11/2008 |

(Continued)

OTHER PUBLICATIONS

Extended European Search Report regarding Patent Application No. 23167002.7, dated Aug. 2, 2023.

*Primary Examiner* — Jun S Yoo
(74) *Attorney, Agent, or Firm* — Harness, Dickey & Pierce, P.L.C.

(57) ABSTRACT

The present disclosure provides a method of manufacturing a damper for a vehicle. The method includes forming a groove on an outer surface of a first component in a first annular region. The first component is tubular. The method further includes inducing a compressive residual stress in a second annular region. The second annular region is at least partially aligned with the first annular region along a longitudinal axis of the first component. The method further includes coupling a second component to the first component. Surfaces of the first component and the second component directly engage one another at an interface. The second component is axially aligned with and radially surrounding at least a portion of the first annular region. In some configurations, forming the groove and inducing the compressive residual stress are performed concurrently, such as by low plasticity burnishing.

20 Claims, 7 Drawing Sheets

(56) References Cited

U.S. PATENT DOCUMENTS

| | | | |
|---|---|---|---|
| 4,892,337 A | | 1/1990 | Gunderson et al. |
| 5,286,069 A | | 2/1994 | Wilson |
| 5,355,968 A | | 10/1994 | Smith |
| 5,358,285 A | | 10/1994 | Wilson |
| 5,607,035 A | * | 3/1997 | Fulks .................... B60G 15/07 188/322.19 |
| 5,727,411 A | | 3/1998 | Sakakibara et al. |
| 6,325,567 B1 | | 12/2001 | Kato et al. |
| 6,666,062 B2 | | 12/2003 | Dole et al. |
| 6,935,152 B2 | | 8/2005 | Dole et al. |
| 9,528,537 B2 | | 12/2016 | Gainor et al. |
| 9,746,110 B2 | | 8/2017 | Teodoriu et al. |
| 2017/0204931 A1 | * | 7/2017 | Schmidt .................... B24C 1/10 |
| 2021/0171149 A1 | | 6/2021 | Thomas et al. |

FOREIGN PATENT DOCUMENTS

| | | |
|---|---|---|
| DE | 102016115825 A1 | 3/2018 |
| FR | 1317815 A | 5/1963 |
| GB | 2014072 A | 8/1979 |
| JP | 4246310 B2 | 4/2009 |
| KR | 20030076817 A | 9/2003 |

\* cited by examiner

METHODS OF MANUFACTURING VEHICLE DAMPER

FIELD

The present disclosure relates to methods of manufacturing a vehicle damper.

BACKGROUND

This section provides background information related to the present disclosure which is not necessarily prior art.

Suspension systems are provided to filter or isolate a vehicle's body (sprung portion) from the vehicle's wheels and axles (unsprung portion) when the vehicle travels over road surface irregularities as well as to control body and wheel motion. In addition, suspension systems are also used to maintain an average vehicle attitude to promote improved stability of the vehicle during maneuvering. Suspension systems may include passive suspension systems, semi-active suspension systems, and fully active suspension systems. Suspension systems include dampers having components, such as pressure tubes and knuckles or brackets, that are in direct contact with one another and susceptible to relative motion during operation of the vehicle.

SUMMARY

This section provides a general summary of the disclosure, and is not a comprehensive disclosure of its full scope or all of its features.

The present disclosure provides a method of manufacturing a damper for a vehicle. The method includes forming a groove on an outer surface of a first component in a first annular region. The first component is tubular. The method further includes inducing a compressive residual stress in a second annular region. The second annular region is at least partially aligned with the first annular region along a longitudinal axis of the first component. The method further includes coupling a second component to the first component. Surfaces of the first component and the second component directly engage one another at an interface. The second component is axially aligned with and radially surrounding at least a portion of the first annular region.

In some configurations, at least a portion of the second annular region is at least partially axially aligned with the interface.

In some configurations, forming the groove is performed concurrently with inducing the compressive residual stress.

In some configurations, the first component is a pressure tube and the second component is one of a mounting bracket or a knuckle.

In some configurations, inducing the compressive residual stress includes performing low plasticity burnishing.

In some configurations, the low plasticity burnishing is performed at a feed rate ranging from 0.05 mm/rev to 0.2 mm/rev.

In some configurations, the low plasticity burnishing is performed at a burnishing force ranging from 2,000 N to 4,000 N.

In some configurations, the method further includes, prior to forming the groove, determining an axial position of the first annular region based on a location of expected maximum fatigue damage.

In some configurations, determining the axial position of the first annular region includes performing finite element analysis on an assembly including the first component and the second component.

In some configurations, an axial extent of the first region ranges from 1 mm to 15 mm.

In some configurations, the groove has a depth ranging from 0.1 mm to half of a thickness of the first component.

In some configurations, the groove has a radius ranging from 1 mm to 4 mm.

In some configurations, the groove includes an edge fillet having a fillet radius ranging from 0.3 mm to 0.7 mm.

In some configurations, the second annular region has a depth of greater than or equal to 0.5 mm.

In some configurations, the depth is equal to a thickness of the first component at a root of the groove.

In some configurations, the first component comprises a material having a yield strength. The compressive residual stress includes an axial compressive residual stress. The axial compressive residual stress has a magnitude of greater than or equal to 50% the yield strength.

In some configurations, the axial compressive residual stress has a magnitude of greater than or equal to 60% of the yield strength.

In some configurations, the compressive residual stress includes an axial compressive residual stress. The axial compressive residual stress has a magnitude of ranging from 300 MPa to 400 MPa.

In some configurations, the compressive residual stress includes a radial compressive residual stress. The first component is formed from a material having a yield strength. The radial compressive residual stress has a magnitude of greater than or equal to 5% of the yield strength.

In some configurations, coupling the second component to the first component includes press-fitting the first component into the second component or clamping the second component to the first component.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
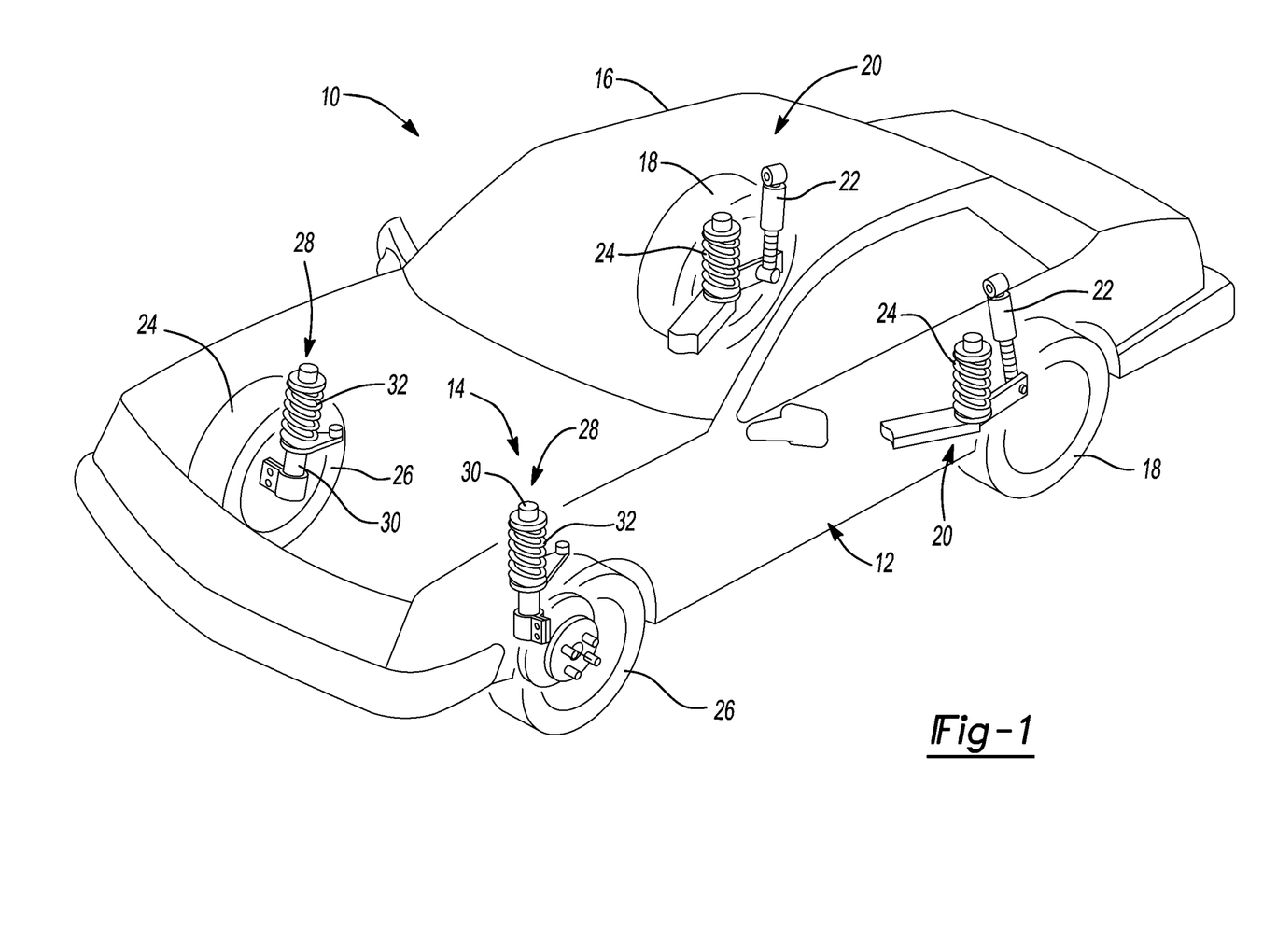
FIG. 1 is a diagrammatic illustration of a vehicle incorporating a suspension system in accordance with the present disclosure.

With reference to FIG. 1, a vehicle 10 having a suspension system in accordance with the present disclosure is provided. The vehicle 10 includes a rear suspension 12, a front suspension 14, and a body 16. The rear suspension 12 has a transversely extending rear axle assembly (not shown) adapted to operatively support the vehicle's rear wheels 18. The rear axle assembly is operatively connected to body 16 by a pair of corner assemblies 20 that include a pair of shock absorbers 22 and a pair of helical coil springs 24. Similarly, the front suspension 14 includes a transversely extending front axle assembly (not shown) to operatively support front wheels 26 of the vehicle 10. The front axle assembly is operatively connected to the body 16 by a second pair of corner assemblies 28 that include a pair of shock absorbers 30 and by a pair of shaped helical coil springs 32. The shock absorbers 22, 30 are adapted to dampen the relative motion of the unsprung portion (i.e., front and rear suspensions 12, 14, respectively) and the sprung portion (i.e., the body 16) of the vehicle 10.

While the vehicle 10 has been depicted as a passenger car having front and rear axle assemblies, the shock absorbers 22 and 30 may be used with other types of vehicles and/or in other types of applications such as vehicles incorporating independent front and/or independent rear suspension systems. Further, the term "shock absorber" as used herein is meant to be dampers in general and thus will include struts. Also, while the front suspension 14 is illustrated having a pair of struts or shock absorbers 30, it is within the scope of the present invention to have rear suspension 12 incorporate a pair of struts or shock absorbers 30 if desired. As illustrated in FIG. 1, the shock absorber 22 is separate from the spring 24. In this configuration, the adjustable spring seat is disposed between the sprung and unsprung portions of the vehicle. Also, the shock absorber 22 and the spring 24 can be replaced with corner assemblies 28.

Figure 2:
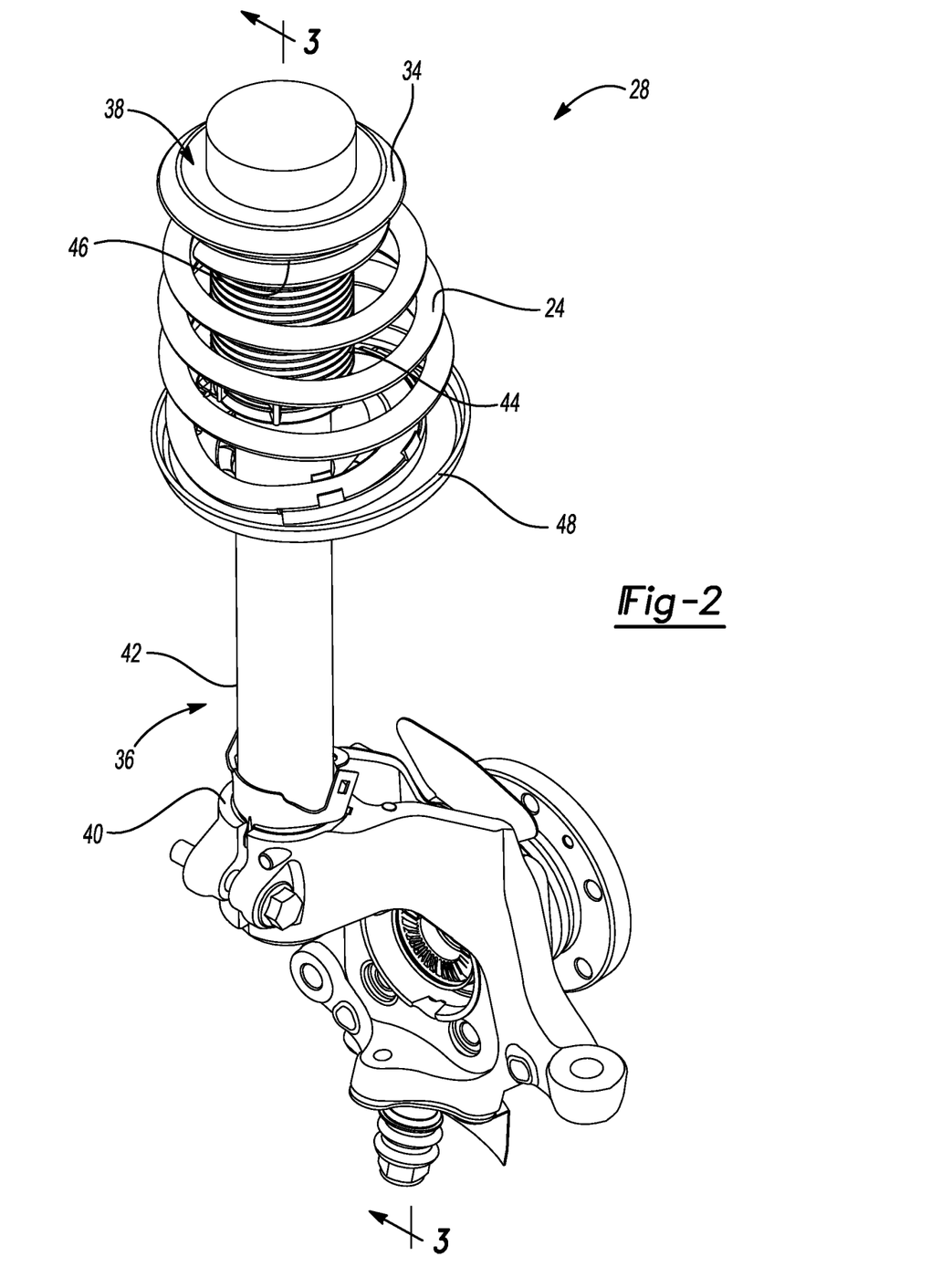
FIG. 2 is a perspective illustration of a corner assembly of the suspension system of FIG. 1 in accordance with the present disclosure.

Referring now to FIG. 2, the front corner assembly 28 for vehicle 10 is illustrated in greater detail. The corner assembly 28 includes a shock tower 34 comprising sheet metal. The corner assembly further includes a damper or strut assembly 36. The strut assembly 36 may include a shock absorber 30, a coil spring 32, a top mount assembly 38, and a knuckle 40, which is part of a wheel assembly. The shock absorber 30 includes a pressure tube 42 for housing a piston assembly and piston rod. A dirt shield 44 protects an elastomeric jounce bumper (not shown). The strut assembly 36 may be attached to the vehicle 10 (shown in FIG. 1) using the shock tower 34. The coil spring 32 is disposed between an upper spring seat 46 and a lower spring seat assembly 48 to isolate body 16 from front suspension 14.

Figure 3:
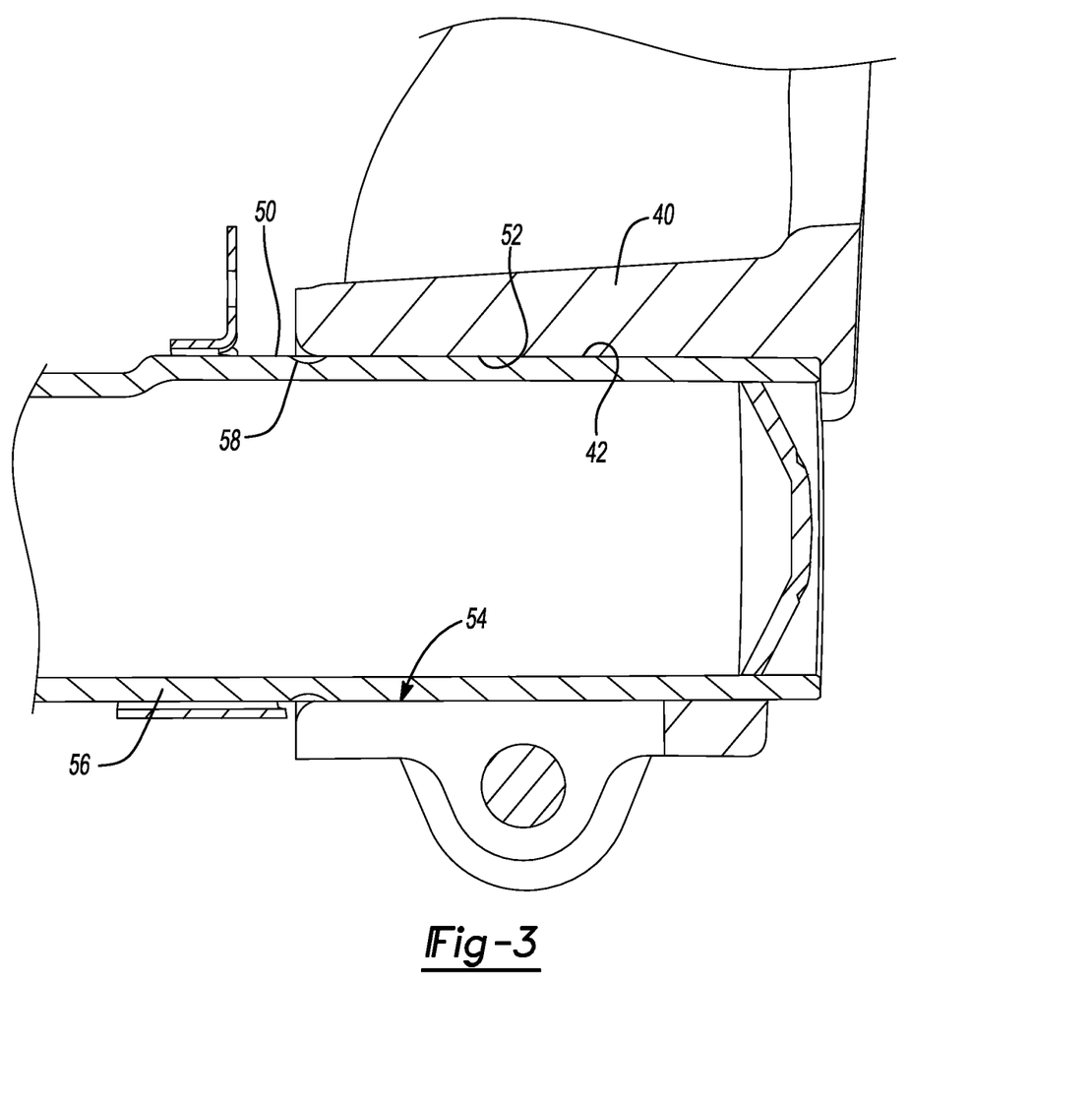
FIG. 3 is a partial sectional illustration of the corner assembly of FIG. 2 taken at line 3-3 of FIG. 2.

With reference to FIG. 3, the pressure tube 42 is press-fit into the knuckle 40. Accordingly, an inner surface 50 of the knuckle 40 is in direct contact with an outer surface 52 of the pressure tube 42. As a result, during operation of the vehicle 10 (shown in FIG. 1), the knuckle 40 and the pressure tube 42 may move relative to one another, causing fatigue crack initiation and propagation and resulting in a reduction in fatigue strength at an annular interface 54 between the knuckle 40 and the pressure tube 42. Accordingly, as will be described in greater detail below in the discussion of FIGS. 6-7, a wall 56 of the pressure tube 42 includes compressive residual stresses, and the outer surface 52 defines an annular groove 58 to synergistically reduce fatigue crack initiation and propagation.

Figure 4:
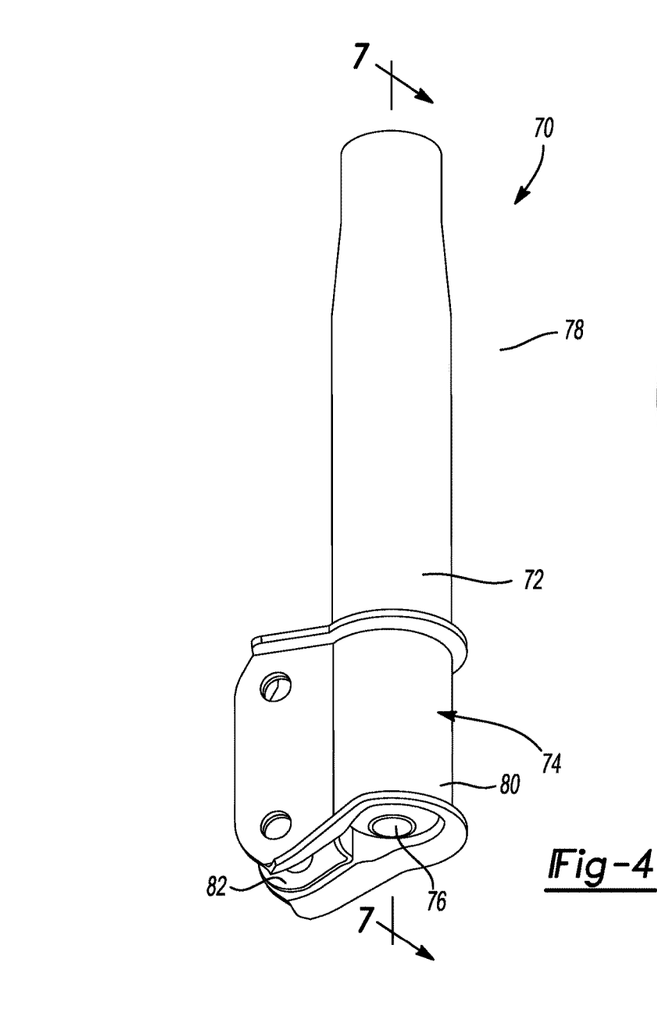
FIG. 4 is a perspective illustration of a corner assembly in accordance with another embodiment of the present disclosure.

Referring to 4, a portion of another corner assembly 70 in accordance with the present disclosure is provided. The corner assembly 70 includes a pressure tube 72, a mounting bracket or foot bracket 74, and a base cup or end cap 76, and a spring seat 78. The mounting bracket 74 includes an outer bracket 80 and an inner bracket 82. The mounting bracket 74 may be clamped or press-fit onto the pressure tube 72 for connecting the corner assembly to wheels of a vehicle. The corner assembly 70 may further include addition components, such as those described above and shown in FIG. 3.

Figure 5:
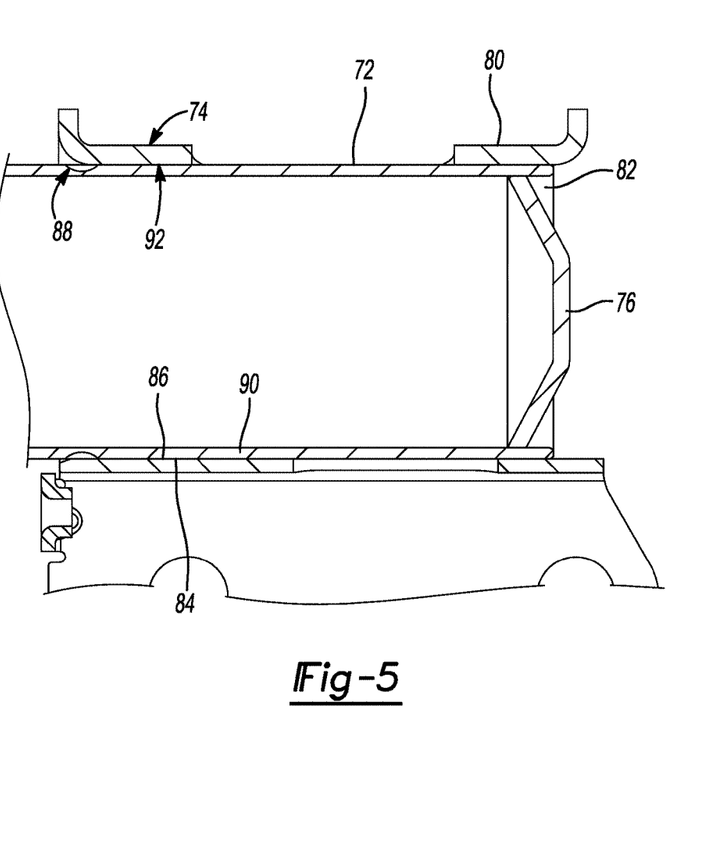
FIG. 5 is a partial sectional illustration of the corner assembly of FIG. 4 taken at line 5-5 of FIG. 4.

With reference to FIG. 5, an outer surface 84 of the pressure tube 72 is in direct contact with an inner surface 86 of the mounting bracket 74. As will be described in greater detail below in the discussion accompanying FIGS. 6-7, a wall 90 of the pressure tube 72 includes compressive residual stresses and the outer surface 84 of the pressure tube 72 defines an annular groove 88 to synergistically reduce fatigue crack initiation and propagation.

Figure 6:
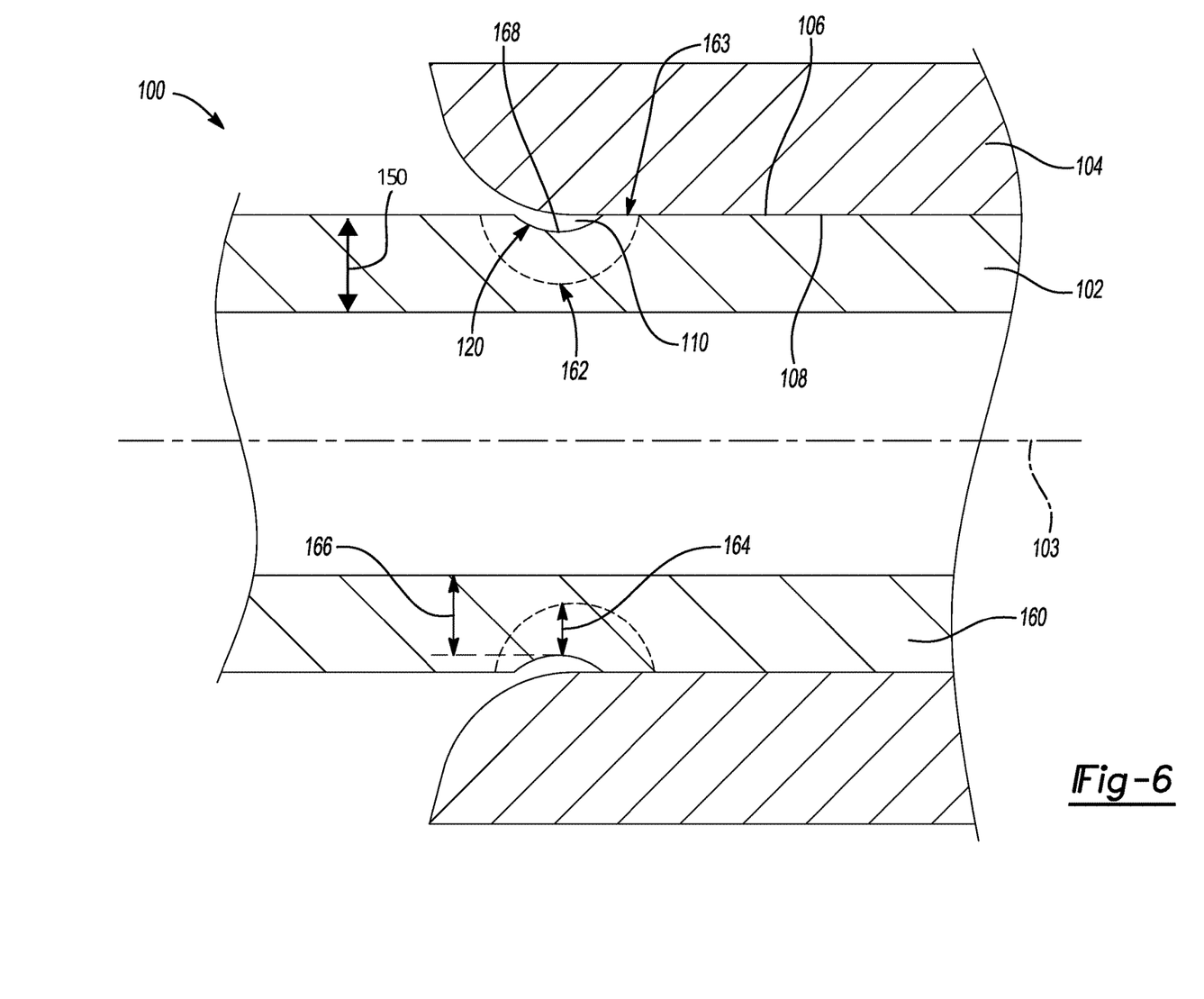
FIG. 6 is a partial sectional illustration of a damper in accordance with another embodiment of the present disclosure.

With reference to FIG. 6, a portion of a damper assembly 100 in accordance with the present disclosure is provided. The damper assembly 100 includes a first component 102 extending along a longitudinal axis 103 and a second component 104. The second component 104 radially surrounds at least a portion of the first component 102. The second component 104 may be press-fit or clamped onto the first component 102 such that an outer surface 106 of the first component 102 directly engages an inner surface 108 of the second component 104.

In at least one example embodiment, the first component 102 is a tubular component, such as a pressure tube (see, e.g., pressure tube 42 of FIG. 2-3 or pressure tube 72 of FIGS. 4-5). The second component 104 may be configured to connect the damper assembly 100 to a vehicle. In at least some example embodiments, the second component 104 includes a knuckle (see, e.g., knuckle 40 of FIG. 2-3) or a mounting or foot bracket (see, e.g., foot bracket 74 of FIGS. 4-5).

The outer surface 106 of the first component 102 may define a groove 110 in a first region 120. The groove 110 may be an annular groove and the first region 120 may be a first annular region. The second component 104 radially surrounds at least a portion of the first region 120. Inner surface 108 of the second component 104 is spaced apart from the outer surface 106 at an axial position of the groove 110.

The presence of the groove 110 may increase fatigue life of the damper assembly 100. For example, the groove 110 reduces contact between the outer surface 106 of the first component 102 and the inner surface 108 of the second component 104 at a location of highest expected bending stress. Accordingly, the groove 110 is adapted to relieve stresses at an interface 92 between the first and second components 102, 104. Additionally, by positioning the groove 110 at the distal end of the second component 104, contact between the first and second components 102, 104 is reduced and the groove 110 changes the fatigue crack initiation and propagation regime of the interface 92 from a mixed stick and slip regime to a gross slip regime, which may generally increase fatigue life of the interface 92.

Figure 7:
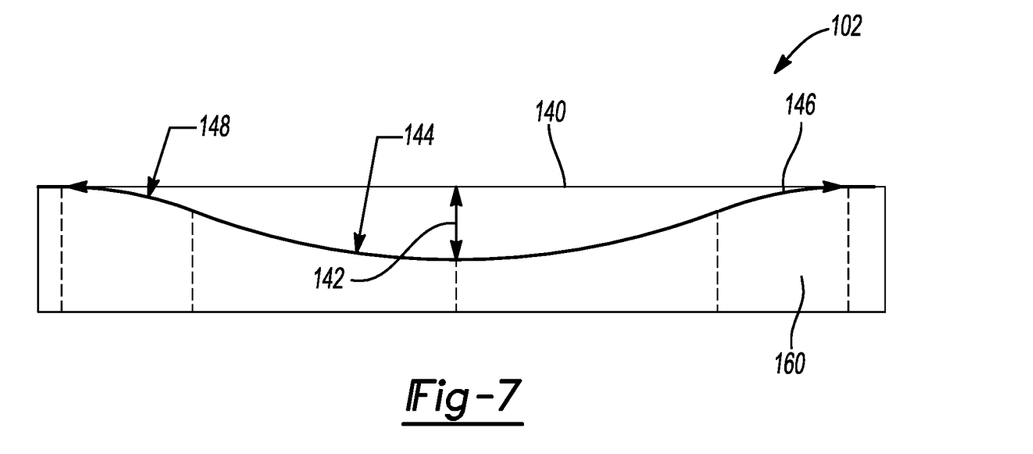
FIG. 7 is a partial sectional illustration of the first component of the damper of FIG. 6, the first component defining a groove.

The first region 120 may be coextensive with the groove 110. Referring to FIG. 7, the groove 110 may be defined by an axial extent or length 140, a first depth 142, and a first or groove radius 144. In at least some example embodiments, the groove 110 may define edge fillets 146. Each of the edge fillets 146 may define a second or edge fillet radius 148.

In at least one example embodiment, the axial extent 140 may be greater than or equal to 1 mm (e.g., greater than or equal to 2 mm, greater than or equal to 3 mm, greater than or equal to 4 mm, greater than or equal to 5 mm, greater than or equal to 6 mm, greater than or equal to 7 mm, greater than or equal to 8 mm, greater than or equal to 9 mm, greater than or equal to 10 mm, greater than or equal to 11 mm, greater than or equal to 12 mm, greater than or equal to 13 mm, or greater than or equal to 14 mm). The axial extent 140 may be less than or equal to 15 mm (e.g., less than or equal to 14 mm, less than or equal to 13 mm, less than or equal to 12 mm, less than or equal to 11 mm, less than or equal to 10 mm, less than or equal to 9 mm, less than or equal to 8 mm, less than or equal to 7 mm, less than or equal to 6 mm, less than or equal to 5 mm, less than or equal to 4 mm, less than or equal to 3 mm, or less than or equal to 2 mm).

The first depth 142 may be less than half of a thickness 150 of the first component 102. In at least one example embodiment, the first depth 142 may be greater than or equal to 0.1 mm (e.g., greater than or equal to 0.15 mm, greater than or equal to 0.2 mm, greater than or equal to 0.25 mm, greater than or equal to 0.3 mm, or greater than or equal to 0.35 mm). The first depth 142 may be less than 0.4 mm (e.g., less than or equal to 0.35 mm, less than or equal to 0.3 mm, less than or equal to 0.25 mm, less than or equal to 0.2 mm, or less than or equal to 0.15 mm).

In at least one example embodiment, the first radius 144 may be greater than or equal to 1 mm (e.g., greater than or equal to 1.5 mm, greater than or equal to 2 mm, greater than or equal to 2.5 mm, greater than or equal to 3 mm, or greater than or equal to 3.5 mm). The first radius 144 may be less than or equal to 4 mm (e.g., less than or equal to 3.5 mm, less than or equal to 3 mm, less than or equal to 2.5 mm, less than or equal to 2 mm, or less than or equal to 1.5 mm).

In at least one example embodiment, the second radius 148 may be greater than or equal to 0.3 mm (e.g., greater than or equal to 0.35 mm, greater than or equal to 0.4 mm, greater than or equal to 0.45 mm, greater than or equal to 0.5 mm, greater than or equal to 0.55 mm, greater than or equal to 0.6 mm, or greater than or equal to 0.65 mm). The second radius 148 may be less than or equal to 0.7 mm (e.g., less than or equal to 0.65 mm, less than or equal to 0.6 mm, less than or equal to 0.55 mm, less than or equal to 0.5 mm, less than or equal to 0.45 mm, less than or equal to 0.4 mm, less than or equal to 0.35 mm, less than or equal to 0.3 mm, or less than or equal to 0.25 mm).

Returning to FIG. 6, a wall 160 of the first component 102 may define compressive residual stresses in a second region 162, which may be a second annular region. The second region 162 axially overlaps with the first region 120. That is, at least a portion of first region 120 and at least a portion of the second region 162 are disposed at a common axial location. The first region 120 is radially outside of at least a portion of the second region 162. The addition of compressive residual stresses in the wall 106 causes of shift in a Woehler curve for the first component 102 to result in further improvement in fatigue life compared to a damper assembly including a groove alone. Importantly, second annular region 162 axially extends beyond groove 110 into a zone of direct contact 163 between first component 102 and second component 104.

The second annular region 162 may define a second depth 164. The second depth 164 may be greater than or equal to 0.5 mm (e.g., greater than or equal to 0.55 mm, greater than or equal to 0.6 mm, greater than or equal to 0.65 mm, greater than or equal to 0.7 mm, greater than or equal to 0.75 mm, or greater than or equal to 0.8 mm). In at least one example embodiment, the second depth 164 is equal to a tube thickness 166 at a root 168 of the groove 110.

The first component 102 is formed from a material having a yield strength. Axial compressive residual stress in the second region 162 is measured at 0° from (i.e., aligned with) the longitudinal axis 103. The axial compressive residual stress in the second region 162 may be greater than or equal to 50% of the yield strength of the material (e.g., greater than or equal to 55% of the yield strength, greater than or equal to 60% of the yield strength, or greater than or equal to 65% of the yield strength). The axial compressive residual stress in the second region may be less than or equal to 70% of the yield strength (e.g., less than or equal to 65% of the yield strength, less than or equal to 60% of the yield strength, or less than or equal to 55% of the yield strength).

In at least one example embodiment, the axial compressive residual stress is greater than or equal to 300 MPa (e.g., greater than or equal to 310 MPa, greater than or equal to 320 MPa, greater than or equal to 330 MPa, greater than or equal to 340 MPa, greater than or equal to 350 MPa, greater than or equal to 360 MPa, greater than or equal to 370 MPa, greater than or equal to 380 MPa, or greater than or equal to 390 MPa). The axial compressive residual stress may be less than or equal to 400 MPa (e.g., less than or equal to 390 MPa, less than or equal to 380 MPa, less than or equal to 370 MPa, or less than or equal to 360 MPa).

Radial compressive residual stress is measured at 90° from the longitudinal axis 103. The radial compressive residual stress in the second region 162 may be greater than or equal to 5% of the yield strength of the material (e.g., greater than or equal to 10% of the yield strength, greater than or equal to 15% of the yield strength, greater than or equal to 20% of the yield strength, or greater than or equal to 25% of the yield strength). The radial compressive residual stress in the second region may be less than or equal to 30% of the yield strength (e.g., less than or equal to 25% of the yield strength, less than or equal to 20% of the yield strength, less than or equal to 15% of the yield strength, or less than or equal to 10% of the yield strength).

In at least one example embodiment, the radial compressive residual stress is greater than or equal to 50 MPa (e.g., greater than or equal to 75 MPa, greater than or equal to 100 MPa, greater than or equal to 125 MPa, or greater than or equal to 150 MPa). The radial compressive residual stress may be less than or equal to 200 MPa (e.g., less than or equal to 175 MPa, less than or equal to 150 MPa, less than or equal to 100 MPa, less than or equal to 75 MPa, or less than or equal to 50 MPa).

Figure 8:
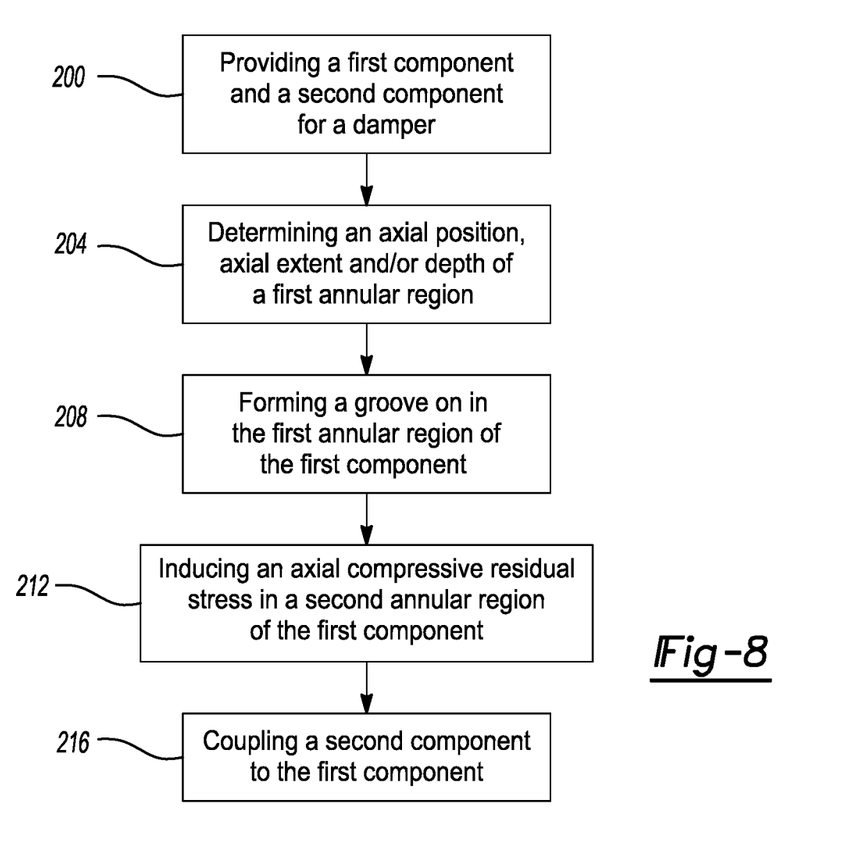
FIG. 8 is a flowchart illustrating a method of manufacturing a damper assembly in accordance with the principles of the present disclosure.

With reference to FIG. 8, a flowchart depicting a method of manufacturing a damper in accordance with the principles of the present disclosure is provided. The method generally includes providing a first component and a second component at 200; determining an axial position, an axial extent, and/or a depth of a first annular region of the first component at 204; forming a groove in the first annular region at 208; inducing an axial compressive residual stress in a second annular region of the first component at 212; and coupling a second component to the first component at 216. Each of these steps is described in greater detail below.

At 200, the method may include providing a first component and a second component of a damper. The first component may be a tubular component. As discussed above, the first component may be a pressure tube and the second component may be a knuckle, a mounting bracket, or a foot bracket. For example, the first component may be the same as or similar to the pressure tube 42 of FIG. 2-3 or the pressure tube 72 of FIGS. 4-5 and the second component may eb the same as or similar to the knuckle 40 of FIG. 2-3 or the mounting bracket 74 of FIGS. 4-5.

At 204, the method may include determining an axial position, an axial extent, and/or a depth of a first annular region of the first component. The first annular region corresponds to a region of highest expected fatigue crack initiation and propagation. For example, the axial position, axial extent, and/or depth of a first annular region may correspond to a region where expected stress exceeds a predetermined value. In at least one example embodiment, determining the axial position, axial extend, and/or depth of a first annular region may include performing finite element analysis (FEA) on an assembly including the first component and the second component.

At 208, the method includes forming a groove in the first annular region of the outer surface of the first component. Forming the groove 208 may include removal of material and/or moving of material. In at least some example embodiments, forming the groove at 208 by moving material may include low plasticity burnishing, crimping, local indentation (e.g., using a solid cylindrical tool), and/or any other suitable method. In at least one example embodiment, forming the groove at 208 by removing material may include rotating the first component in a lathe or any other suitable process.

At 212, the method includes inducing a compressive residual stress in a second region. The compressive residual stress may include an axial compressive residual stress. The compressive residual stress may further include a radial compressive residual stress. Inducing a compressive residual stress at 212 may include low plasticity burnishing, peening (e.g., laser peening, shot peening), crimping, local indentation (e.g., using a solid cylindrical tool), or any other suitable method.

In at least one example embodiment, forming the groove at 208 and inducing compressive axial residual stress at 212 are performed concurrently by the same operation, such as when the groove is formed by a mechanical process. For example, a low plasticity burnishing process may be performed to concurrently form the groove and induce the compressive residual stresses. In at least one other example embodiment, forming the groove at 208 and inducing the compressive residual stresses at 212 are performed in separate steps, such as when the groove is formed via non-mechanical process.

In the low plasticity burnishing process, a magnitude of the compressive residual stresses may be controlled by feed rate and/or burnishing force. In at least one example embodiment, the feed rate is greater than or equal to 0.05 millimeters axial advancement per revolution (mm/rev) (e.g., greater than or equal to 0.075 mm/rev, greater than or equal to 0.1 mm/rev, greater than or equal to 0.125 mm/rev, greater than or equal to 0.15 mm/rev, or greater than or equal to 0.175 mm/rev). The feed rate may be less than or equal to 0.2 mm/rev (e.g., less than or equal to 0.175 mm/rev, less than or equal to 0.15 mm/rev, or less than or equal to 0.125 mm/rev, less than or equal to 0.15 mm/rev, less than or equal to 0.125 mm/rev, or less than or equal to 0.1 mm/rev, or less than or equal to 0.075 mm/rev). In at least one example embodiment, the burnishing force is greater than or equal to 2,000 N (e.g., greater than or equal to 2,250 N, greater than or equal to 2,500 N, greater than or equal to 2,750 N, greater than or equal to 3,000 N, greater than or equal to 3,250 N, greater than or equal to 3,500 N, or greater than or equal to 3,750 N). The burnishing force may be less than or equal to 4,000 N (e.g., less than or equal to 3,750 N, less than or equal to 3,500 N, less than or equal to 3,250 N, less than or equal to 3,000 N, less than or equal to 2,750 N, less than or equal to 2,500 N, or less than or equal to 2,250 N).

At 212, the method includes assembling the damper. Assembling the damper includes coupling the second component to the first component such that an inner surface of the second component is in direct contact with an outer surface of the first tubular component. The second component radially surrounds at least a portion of the first annular region (e.g., the entire first region). In at least one example embodiment, the second component is press-fit to the first tubular component. In at least one other example embodiment, the second component is clamped to the first tubular component.

Example 1

Five different grooves are formed at different axial locations on an outer surface of a tube by a low plasticity burnishing process. The tube comprises a material having a yield strength of about 600 MPa. Feed rates are varied between 0.1 mm mm/rev and 0.2 mm/rev. Burnishing force is varied between 2,400 N and 3,500 N.

After the grooves are formed, X-ray diffraction (XRD) is used to determine residual stresses for each groove. Residual stresses are measured at 0° (axially) from a longitudinal axis of the tube, at 45° from the longitudinal axis, and at 90° (radially) from the longitudinal axis. Measurements are taken at three different angular locations about the longitudinal axis: 0°, 120°, and 240°. Each measurement is taken at the respective groove root surface.

Results are shown in Table 1, below. The results demonstrate that the axial compressive residual stresses are greater than about 50% of the yield strength of the tube. More specifically, the axial compressive residual stresses range from about 59% to about 67% of the yield strength of the tube. The radial compressive stresses are greater than or equal to about 5% of the yield strength of the tube. More specifically, the radial compressive residual stresses range from about 9% to about 28% of the yield strength of the tube. The results also demonstrate that the axial and radial compressive residual stresses are induced throughout an entire circumference of the tube.

TABLE 1

Effect of burnishing parameters on residual stresses.

| Feed Rate (mm/rev) | Force (N) | Angle (°) | Residual Stress 0° (MPa) | Residual Stress 90° (MPa) | Residual Stress 45° (MPa) |
|---|---|---|---|---|---|
| 0.1 | 2400 | 0 | −369.7 | −101 | −284.2 |
|  |  | 120 | −372.1 | −130.4 | — |
|  |  | 240 | −400 | −104.4 | — |
| 0.1 | 3000 | 0 | −392.1 | −114.1 | −275.8 |
|  |  | 120 | −370.6 | −164.8 | — |
|  |  | 240 | −398.3 | −110.1 | — |
| 0.1 | 3500 | 0 | −375.6 | −76.5 | −249.6 |
|  |  | 120 | −366.9 | −141.8 | — |
|  |  | 240 | −384.6 | −78.3 | — |
| 0.15 | 3000 | 0 | −378.6 | −73.4 | −251 |
|  |  | 120 | −364.7 | −83.3 | — |
|  |  | 240 | −354.8 | −55.5 | — |
| 0.2 | 3000 | 0 | −374.1 | −53.3 | −240.4 |
|  |  | 120 | −357.8 | −107.3 | — |
|  |  | 240 | −352.5 | −156.7 | — |

Example 2

A low plasticity burnishing process is used to form an annular groove in an outer surface of a tube. The process is performed at a feed rate of 0.1 mm/rev and a burnishing force of 2,400 N. Axial and radial compressive residual stresses are measured at different depths using XRD, with 0 mm corresponding to a surface of the groove root. The results are shown below in Table 2. The results demonstrate that the compressive residual stresses are present to depths of at least about 0.8 mm for this set of burnishing parameters.

TABLE 2

Residual Stresses at Different Depths.

| Depth (mm) | Residual stress 0° (MPa) | Residual stress 90° (MPa) |
| --- | --- | --- |
| 0 | −372 | −104.8 |
| 0.019 | −369.6 | −90.9 |
| 0.065 | −377 | −104.8 |
| 0.11 | −413.7 | −131.3 |
| 0.165 | −421.9 | −156.2 |
| 0.24 | −426.4 | −193.2 |
| 0.52 | −266.4 | −207.2 |
| 0.82 | −216 | −267.6 |

Example 3

A low plasticity burnishing process is used to form an annular groove in an outer surface of a tube. The process is performed at a feed rate of 0.1 mm/rev and a burnishing force of 3,500 N. Axial and radial compressive residual stresses are measured at different depths using XRD, with 0 mm corresponding to a surface of the groove root. The results are shown below in Table 3. The results demonstrate that the compressive residual stresses are present at depths of at least about 0.5 mm for this set of burnishing parameters.

TABLE 3

Residual Stresses at Different Depths.

| Depth (mm) | Residual stress 0° (MPa) | Residual stress 90° (MPa) |
| --- | --- | --- |
| 0 | −375.6 | −76.5 |
| 0.024 | −357.6 | −75.7 |
| 0.066 | −368.8 | −89.9 |
| 0.108 | −406 | −111.9 |
| 0.163 | −404.9 | −123.4 |
| 0.238 | −435.2 | −153.8 |
| 0.39 | −385 | −174.2 |
| 0.54 | −287.6 | −191.5 |

Example 4

First and second assemblies are prepared. The first assembly includes a knuckle coupled to a tube without a groove or compressive residual stresses. The second assembly includes a knuckle coupled to a tube having a groove and compressive residual stresses. The groove is formed via low plasticity burnishing at a feed rate of 0.1 mm/rev and a burnishing force of 2,400 N. The assemblies are subjected to cyclic loading. Results are shown in FIG. 9.

Figure 9:
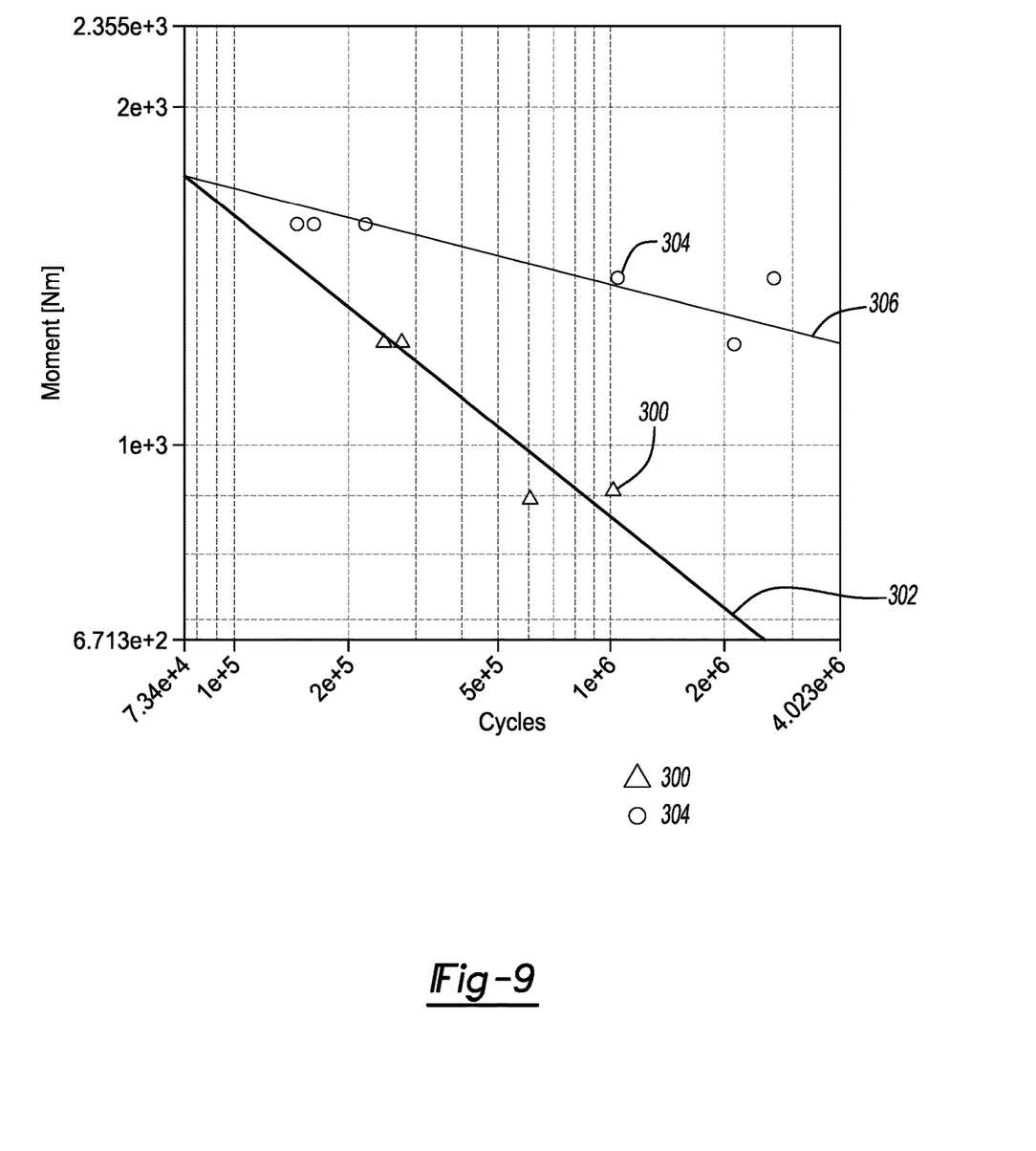
FIG. 9 is a graph depicting damage parameters each of a tube without a groove and a tube having a groove.

FIG. 9 is a graph depicting cycle life on the x-axis and moment on the y-axis. Data points for the first assembly are shown at 300 and a trend line for the first assembly is shown at 302. Data points for the second assembly are shown at 304 and a trend line for the second assembly is shown at 306. As shown, at a constant moment, the second assembly has a higher cycle life than the first assembly. Accordingly, the results generally indicate that the second assembly having the groove and compressive residual stresses has a higher durability than the first assembly including the untreated tube.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A method of manufacturing a damper for a vehicle, the method comprising:
    forming a groove on an outer surface of a first component in a first annular region, the first component being tubular;
    inducing a compressive residual stress in a second annular region, wherein forming the groove is performed concurrently with inducing the compressive residual stress, the second annular region being at least partially aligned with the first annular region along a longitudinal axis of the first component; and
    coupling a second component to the first component such that surfaces of the first component and the second component directly engage one another at an interface, the second component being axially aligned with and radially surrounding at least a portion of the first annular region.

2. The method of claim 1, wherein at least a portion of the second annular region is at least partially axially aligned with the interface.

3. The method of claim 1, wherein the first component is a pressure tube and the second component is one of a mounting bracket or a knuckle.

4. The method of claim 1, wherein inducing the compressive residual stress includes performing low plasticity burnishing.

5. The method of claim 4, wherein the low plasticity burnishing is performed at a feed rate ranging from 0.05 mm/rev to 0.2 mm/rev.

6. The method of claim 4, wherein the low plasticity burnishing is performed at a burnishing force ranging from 2,000 N to 4,000 N.

7. The method of claim 1, wherein an axial extent of the first region ranges from 1 mm to 15 mm.

8. The method of claim 1, wherein the groove has a depth ranging from 0.1 mm to half of a thickness of the first component.

9. The method of claim 1, wherein the groove has a radius ranging from 1 mm to 4 mm.

10. The method of claim 1, wherein the groove includes an edge fillet having a fillet radius ranging from 0.3 mm to 0.7 mm.

11. The method of claim 1, wherein the second annular region has a depth of greater than or equal to 0.5 mm.

12. The method of claim 11, wherein the depth is equal to a thickness of the first component at a root of the groove.

13. The method of claim 1, wherein the first component comprises a material having a yield strength and the compressive residual stress includes an axial compressive residual stress having a magnitude of greater than or equal to 50% the yield strength.

14. The method of claim 13, wherein the axial compressive residual stress has a magnitude of greater than or equal to 60% of the yield strength.

15. The method of claim 1, wherein the compressive residual stress includes an axial compressive residual stress having a magnitude ranging from 300 MPa to 400 MPa.

16. The method of claim 1, wherein the compressive residual stress includes a radial compressive residual stress, the first component is formed from a material having a yield strength, and the radial compressive residual stress has a magnitude of greater than or equal to 5% of the yield strength.

17. The method of claim 1, wherein coupling the second component to the first component includes press-fitting the first component into the second component or clamping the second component to the first component.

18. A method of manufacturing a damper for a vehicle, the method comprising:
    forming a groove on an outer surface of a first component in a first annular region, the first component being tubular;
    inducing a compressive residual stress in a second annular region, the second annular region being at least partially aligned with the first annular region along a longitudinal axis of the first component; and
    coupling a second component to the first component such that surfaces of the first component and the second component directly engage one another at an interface, the second component being axially aligned with and radially surrounding at least a portion of the first annular region, the method further comprising, prior to forming the groove, determining an axial position of the first annular region based on a location of expected maximum fatigue damage.

19. The method of claim 18, wherein determining the axial position of the first annular region includes performing finite element analysis on an assembly including the first component and the second component.

20. A method of manufacturing a damper for a vehicle, the method comprising:
    forming a groove on an outer surface of a first component in a first annular region, the first component being tubular;
    inducing a compressive residual stress in a second annular region of the first component, the second annular region being at least partially aligned with the first annular region along a longitudinal axis of the first component; and
    coupling a second component to the first component such that surfaces of the first component and the second component directly engage one another at an interface, the second component being axially aligned with and radially surrounding at least a portion of the first annular region, wherein the second component includes a distal end that is cantilevered over and spaced apart from the outer surface of the first component at an axial position of the groove.

* * * * *